United States Patent [19]

Staffer

[11] Patent Number: 4,991,032
[45] Date of Patent: Feb. 5, 1991

[54] SYNCHRONIZATION OF RECORDINGS

[75] Inventor: Andrew Staffer, Thornhill, Canada

[73] Assignee: Soundmaster International Inc., Markham, Canada

[21] Appl. No.: 148,053

[22] Filed: Jan. 25, 1988

[51] Int. Cl.$^5$ .................. H04N 5/782; G11B 27/10
[52] U.S. Cl. .................................................. 360/14.3
[58] Field of Search ................... 360/13, 143, 15; 358/311

[56] References Cited

U.S. PATENT DOCUMENTS

| | | | |
|---|---|---|---|
| 3,938,105 | 2/1976 | Lechner | 360/48 |
| 4,498,146 | 2/1985 | Martinez | 360/31 X |
| 4,591,928 | 5/1986 | Bloom et al. | 360/13 |
| 4,743,981 | 5/1988 | Spencer et al. | 360/15 |
| 4,746,994 | 5/1988 | Ettlinger | 360/13 |
| 4,754,342 | 6/1988 | Duffy | 360/14.3 |
| 4,772,966 | 9/1988 | Sharples et al. | 360/13 X |
| 4,835,626 | 5/1989 | Wilkinson et al. | 358/311 X |
| 4,839,733 | 6/1989 | Karamon et al. | 360/13 X |
| 4,858,033 | 8/1989 | Chippendale | 360/14.2 |
| 4,862,411 | 8/1989 | Dishon et al. | 360/15 X |

*Primary Examiner*—Donald McElheny, Jr.
*Attorney, Agent, or Firm*—Mirek A. Waraksa

[57] ABSTRACT

A playback system permits two or more recordings associated with time condes to be retrieved synchronously at variable relative speeds. A master playback unit retrieves a master video recording and the associated master time code and a slave playback unit retrieves a slave audio recording and the associated slave time code. A microprocessor scales the slave audio time code to produce virtual slave time code, and the master and virtual slave time codes are compared to produce a virtual offset whcih is maintained substantially constant with speed control thereby synchronizing the operation of the master and slave playback units. An operator can select the magnitude of the virtual offset, and can also select the scaling factor used to produce the virtual slave code thereby varying the retrieval speed of the slave playback unit relative to the master playback unit, effectively compressing or expanding the slave recording relative to the master recording. The operator can also advance the master tape to a required position and then advance the slave tape in response to the virtual offset to a corresponding position either manually or automatically. Accordingly, both variable speed synchronization and convenient advancing of master and slave tapes to corresponding positions are possible.

4 Claims, 2 Drawing Sheets

SYNCHRONIZATION OF RECORDINGS

FIELD OF THE INVENTION

The invention relates generally to synchronized retrieval of recorded signals or information, and more specifically to the synchronized retrieval of recordings containing time codes. The invention has particularly useful application to the synchronization of video and audio signals recorded on magnetic tapes for purposes of combining such signals to produce a single recording such as a movie, commercial or the like.

DESCRIPTION OF THE PRIOR ART

In the production of a tape containing both audio and video signals, it is common for initial video and audio recordings to be made on separate magnetic tapes. Such an arrangement permits the various signals to be selectively combined or edited to produce a final tape. Thus dialogue, sound effects or music might be added to pre-recorded video materials.

In such a process, each recording commonly includes a time code which facilitates synchronization and editing. In the case of video recordings, the time code may be divided into segments associated with the individual frames of the video materials, and during playback each frame might be displayed together with the associated time code segment on appropriate monitors. Similar time codes will normally be associated with audio recordings to permit sequentially or temporally spaced-apart portions of an audio recording to be visually identified on a monitor during playback and audible reproduction of the recording. In such processes, the video recording normally serves as a master recording, and the audio recordings are treated as slave recordings to be synchronized with the master recording. An editor will normally playback both the video master tape and one or more audio slave tapes, adjusting the operation of the slave playback units to synchronize the video and audio signals as required. The time codes serve as important reference points for operator decisions regarding synchronization.

One standard synchronization system comprises a master playback unit which might operate a video tape at its nominal operating speed. A plurality of slave audio tapes containing dialogue, music and sound effects will normally be operated on slave playback units. Controls are provided which compare the time codes retrieved by the master and slave playback units and which adjust the speed of the slave playback units to ensure that common offsets are maintained between the various time codes, thereby ensuring that the various playback units are operating at a common speed. To permit visual and audio information to be properly synchronized, such systems commonly permit the operator to select the offset to be maintained between the master video recording and each of the slave audio recordings. The various offsets might be adjusted to synchronize speech with lip movement or to ensure that sound effects are recorded synchronously with video events.

Such operation is singularly advantageous for purposes of reviewing and editing recordings. The master video tape may be advanced forwards or backwards to a particular frame where editing is required. Since a constant offset is maintained between master and slave time codes, the slave tapes can be advanced to corresponding positions. To that end, such systems have been adapted to store the current value of the relative offsets and to permit each slave tape to be advanced either manually or automatically until its time code corresponds to the master time code associated with the particular frame of the video recording plus the associated offset.

A principal shortcoming in such prior systems which maintain a constant offset between retrieved master and slave time codes is that one cannot compress or expand one recording relative to another. For instance, it might be desirable to compress or expand audio signals relative to a video signal to make sound events start and terminate with video events. Variable speed synchronization systems have been developed for such purposes and are capable of synchronizing master and slave tapes played back at different operating speeds.

Variable speed synchronization systems commonly compare the time codes retrieved from master video and slave audio tapes and operate associated master and slave playback units so as to maintain a relative offset having a constant rate of change. The operator may set the required operating speed of a slave playback unit by effectively specifying the required rate of offset change. An initial offset might be selected which tends to synchronize the audio and video recordings at the start of a visual event, then the slave audio recording might be played back at a greater speed than the master video recording in order to compress the audio recording. Such systems commonly display the retrieved video time code, the retrieved audio time code, and the relative offset between the two, and a system operator will note that the offset between the displayed time codes is constantly changing during variable speed operation.

Although variable speed operation is very useful, it has to date had a very severe shortcoming. In particular, the offset between two recordings is meaningless once playback is stopped and the master tape is advanced to a new frame. There is basically no mechanism for advancing slave audio tapes to positions corresponding to a particular frame of the master video tape. In practice, the master and slave tapes must be played forwards or backward while maintaining the required relative rates of movement until all tapes have arrived at the required locations, an operation which is extremely time consuming. To the knowledge of the inventor, this problem has plagued the audio-visual industry to the present date and no reliable solution has been proposed or implemented.

It would accordingly be desirable to provide new synchronization systems and control techniques which inter alia lend themselves to variable speed operation while permitting slave recordings to be conveniently advanced to appropriate positions when a master recording is advanced by an operator.

BRIEF SUMMARY OF THE INVENTION

According to the invention, two recordings associated with time codes can be retrieved synchronously at variable relative retrieval speeds while maintaining an offset which appears to be constant. The time code associated with at least one of the recordings is transformed into a "virtual time code", that is, a time code identifying sequentially or temporally spaced-apart portions of the recording, scaled relative to original time code from which it was generated. The relationship between the original time code and the virtual time code may typically comprise a simple scaling of the original time code according to a constant scale factor. The virtual time code is compared with the time code associated with the other recording, and the relative speed of retrieval is adjusted so as to maintain a constant "virtual offset" between the virtual time code associated with the one recording and the time code associated with the other recording. By varying the nature of the relationship, for example, by increasing or decreasing the magnitude of a scaling factor, one recording can be retrieved at different speeds relative to the other recording while maintaining the constant virtual offset. This basic technique can be used to synchronize retrieval of a plurality of slave recordings with a master recording.

In one aspect, the invention provides a control system for synchronizing sequential retrieval of first and second recordings by appropriate first and second retrieval means at variable relative retrieval speeds. The first recording might, for example, be a slave audio recording and the second recording, a master video recording. Means are provided for transforming time code associated with the first recording into a virtual time code according to a selectable relationship. Means are provided to permit an operator to specify the relationship between the first time code and the virtual time code. Control means compare the virtual time code associated with the first recording with time code associated with the second recording and vary the rate of retrieval of first recording such that a substantially constant offset is maintained between the virtual time code associated with the first recording and the time code associated with the second recording, namely, a constant virtual offset. Means are preferably provided to permit the operator to select the magnitude of the virtual offset to be maintained. Variation of the relationship between the time code associated with the first recording and the corresponding slave time code once again implicitly serves to vary the relative rate of retrieval of the first recording.

The control system may be adapted to permit an operator to advance the first recording to an appropriate position whenever the second recording is rapid advanced. This may be done automatically by storing an operator specified offset and providing means which automatically advance the first retrieval means, either immediately or when appropriately actuated, to a portion of the first recording for which the associated virtual time code corresponds to the current value of the second time code plus the offset (positive or negative). Alternatively, the virtual time code and/or the virtual offset may be displayed so that the operator can control the advancing of the first recording in a manual or semi-automatic manner to arrive at the appropriate portion of the first recording.

In another aspect, the invention provides a controller which operates retrieval means in such a manner as to synchronize retrieval of a recording relative to a reference time code at variable retrieval speeds. Means are provided for transforming time code associated with the recording into a virtual time code according to a selectable relationship and to permit an operator to specify the relationship. Control means comparing the virtual time code with the reference time code and adjust the operating speed of the retrieval means such that a constant offset is maintained between the virtual time code and the reference time code. The control means may respond to a reference offset signal to maintain the offset at a desired value.

The term "time code" as used in the present specification including the appended claims should be understood as any code or signal which is capable of identify sequentially or temporally spaced-apart portions of a recording. The term should be understood as encompassing not only codes whose units are hours, minutes, and seconds or factions of a second, but also codes in length units as might be obtained, for example, by continuously monitoring the movement of a recording tape and indicating elapsed footage. Time code "associated" with a recording may be stored together with the recording for sequential retrieval of both the recording and time code or may be obtained in any appropriate metering technique during retrieval or advancing of the recording. The term "generating" as used in respect of time code should be understood as encompassing both retrieval of stored time code and the generation of time code by any appropriate technique including metering of tape position.

Other aspects of the present invention and associated objects and advantages will be apparent from a description of a preferred embodiment below and will be more specifically identified in the appended claims.

DESCRIPTION OF THE DRAWINGS

The invention will be better understood with reference to drawings in which.

Figure 1:
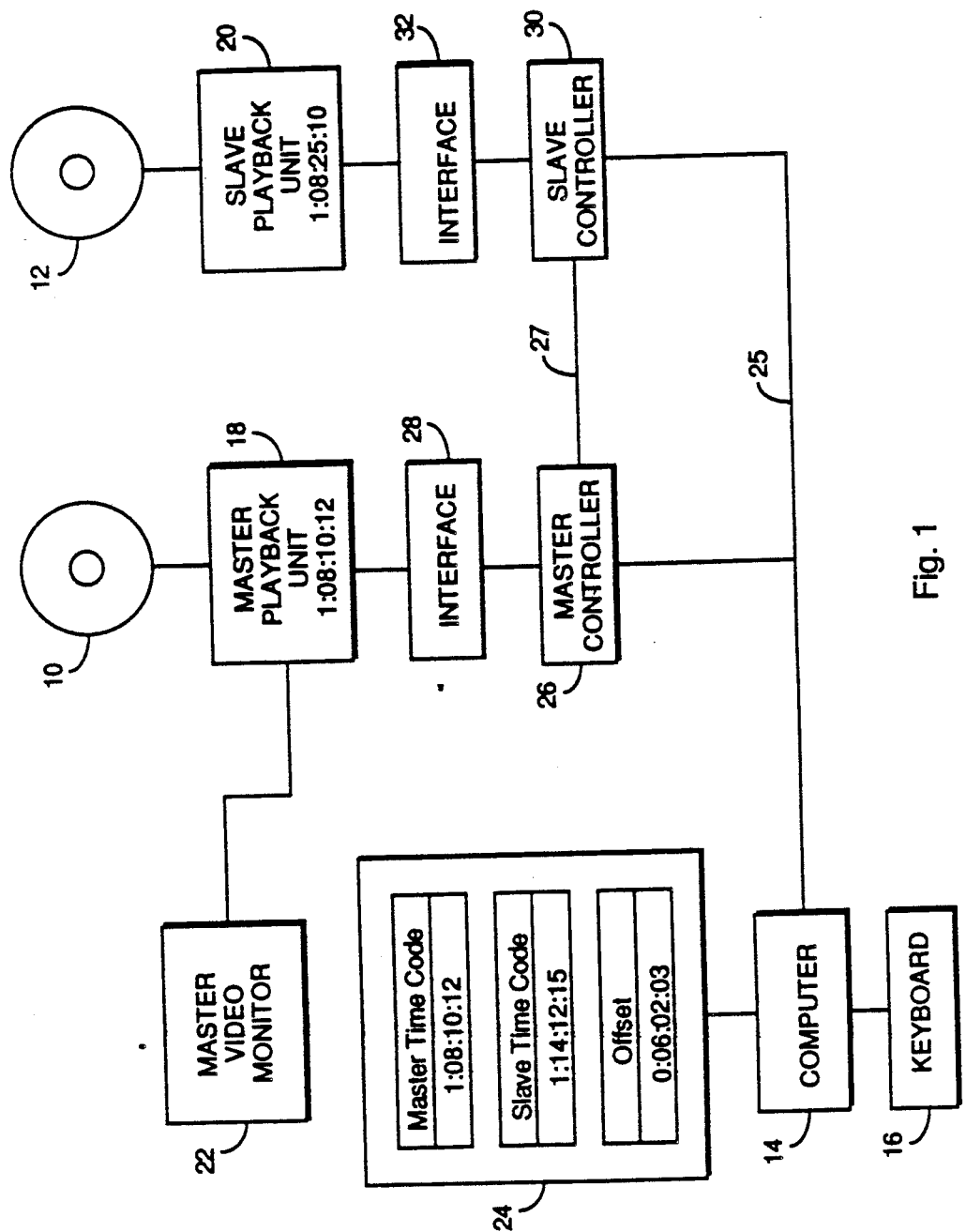
FIG. 1 diagrammatically illustrates the general configuration of a synchronizing system embodying the invention; and, FIG. 2 diagrammatically illustrates the general configuration of a local synchronization controller associated with a slave playback unit of the synchronizing system.

In the drawings, labels in upper case have been used to identify functional blocks of the overall system and of the local synchronization controller associated with the slave playback unit. Labels in lower case proximate to data transmission lines and buses have been used to identify data or signals generated by system components. Lines with arrows indicate the direction of data or signal flow.

DESCRIPTION OF PREFERRED EMBODIMENT

FIG. 1 shows the principal components of a synchronizer for synchronizing playback of two magnetic recording tapes, a master video tape 10 and a slave audio tape 12. The synchronizer includes a computer 14 (which is preferably an inexpensive personal computer) and an associated keyboard 16 which permit the operator to regulate system operation. The system includes a master playback unit 18 for sequentially retrieving a recording associated with the master video tape 10, the master recording being divided into individual visual frames each associated with time code. The current value of the time code retrieved by the master playback unit 18 is indicated in FIG. 1 on the master video playback unit itself, namely, 1:08:10:12. This figure represents in a conventional manner the number of hours, minutes, seconds, and frames or subframes (24, 25, 29.97 or 30 frames per second being typical depending on the configuration of the system) elapsed. The system also includes slave audio playback unit 20 for sequentially retrieving the audio recording associated with the slave tape 12, which recording includes time code segments distributed along the slave tape 12 and identifying sequentially or temporally spaced-apart portions of the audio recording. The current value of the retrieved slave time code is indicated in FIG. 1 on the slave playback unit 20 itself, namely, 1:08:25:10 in units as described above.

The system includes monitors 22, 24 for displaying information regarding the master and slave tapes 10, 12. These displays are used in connection with the manipulation of the master and slave tapes 10, 12 during editing and ultimate combination into a single tape. The additional recorder required to produce such a single tape from signals derived from the playback units has not been illustrated. The monitor 22 displays the current frame of the master tape 10 being retrieved by the master playback unit 18. The monitor 24 displays time codes and offsets, namely, the current value of the master time code; the current value of the virtual time code associated with the slave audio recording; and the offset between the retrieved master time code and the virtual slave time code, this offset being a virtual offset which is not the actual position of the slave recording relative to the master recording. In practice, a number of slave audio tapes might be played back synchronously with the master video tape 10 and their respective virtual slave time codes and virtual offsets relative to the master video recording would also be displayed on the monitor 24. Data signals required to be transferred between the computer 14 and the playback units connected to the system can be conveyed along a common data bus 25.

The master playback unit 18 is coupled to the computer 14 through a local sychronization controller 26. An interface board 28 is provided to accommodate characteristics of the particular master playback unit 18, transforming status and control signals transferred between the master playback unit 18 and the synchronization controller 26 into signals of the type expected by each component. This particular arrangement permits a standard controller to be constructed for all synchronization systems with characteristics peculiar to a particular playback unit accommodated by customized circuitry.

The local synchronization controller 26 has two modes of operation which can be set by the operator at the keyboard: one mode in which the controller 26 recognizes the associated playback unit 18 as a master unit; another mode in which the controller 26 recognizes the playback unit 18 as a slave unit and modifies its operations accordingly. While operating the playback unit 18 as a master unit, the local synchronization controller 26 receives time code and status information from the master playback unit 18 including information regarding whether the master playback unit 18 is stopped, operating, its operating speed and the like. It transforms such information into a format appropriate for processing by the computer 14. The local synchronization controller 26 also receives control signals from the computer 14 instructing required operation of the master playback unit 18. These instructions might include stop, start, rewind, fast forward and information specifying required operating speed. The operating speed might be regulated by the master playback unit 18 itself in response to a speed command signal; however, the local synchronization controller 26 has an operating mode in which it detects the rate of change of the time code retrieved by the master playback unit 18 and compares this rate of change with a speed reference signal specified by the operator at the computer keyboard 16 and adjusts the operating speed of the master playback unit 18. The local synchronization controller 26 can transmit the retrieved master time code to other devices along a data line 27. The general functions required of the local synchronization controller 26 are largely conventional and appropriate implementation of such functions in either hardware, software or hybrid form will be apparent to those skilled in the art.

The slave playback unit 20 is coupled to a local synchronization controller 30 by means of an interface board 32. It should be noted that the synchronization controller 26 associated with the master playback unit 18 is in fact identical in construction and operation to the local synchronization controller 30, but its mode of operation has been selected such that the associated playback unit is treated as a master playback unit 18. Accordingly, in a typical system a large number of playback units may be coupled to the computer 14 with similar synchronization controllers. Any one of the synchronization controllers may be specified by appropriate commands at the computer keyboard 16 to function as the master synchronization controller and the rest, to function as local synchronization controllers.

Figure 2:
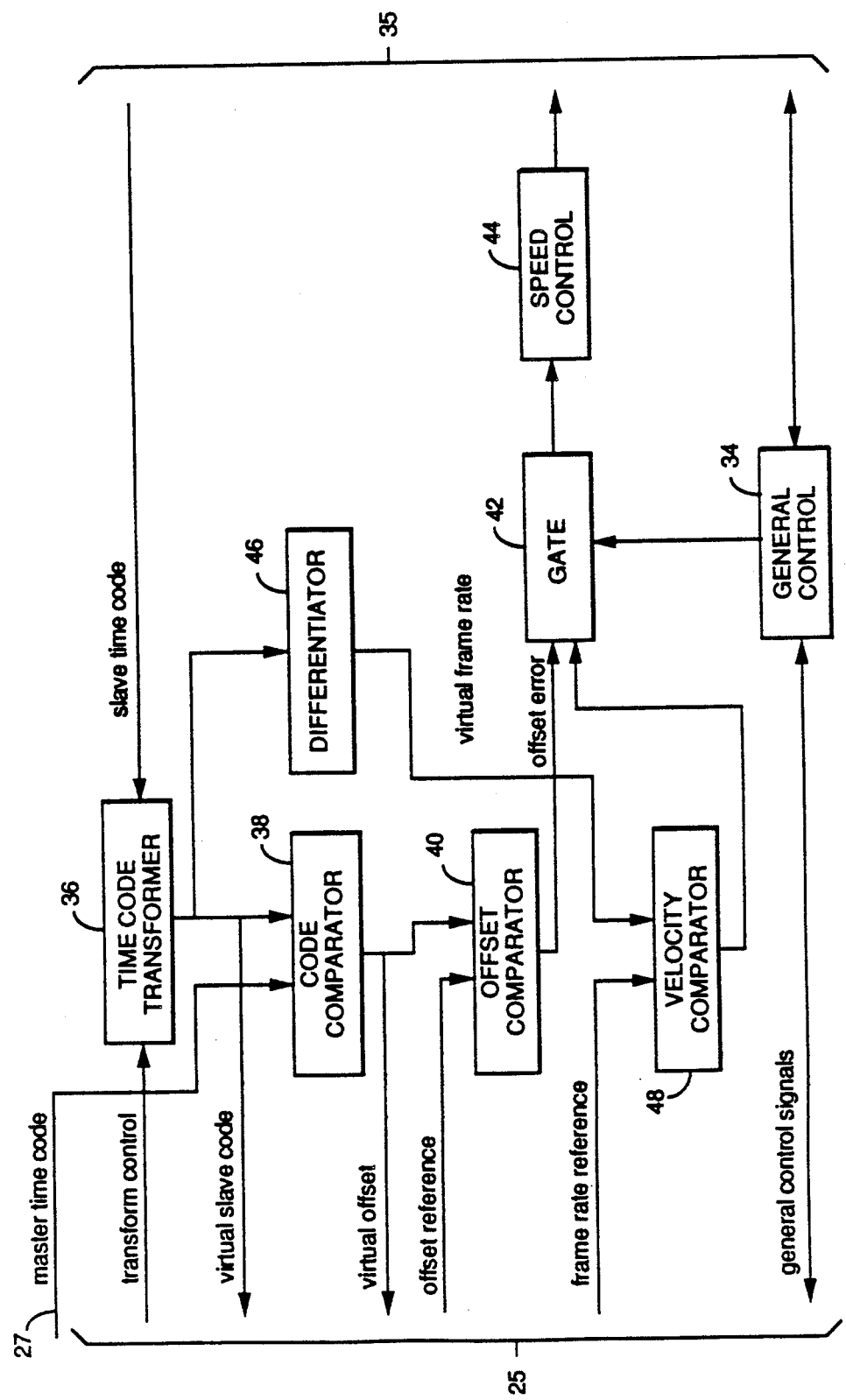

The configuration of the local synchronization controller 30 will be described with reference to FIG. 2. The operations of the local synchronization controller 30 include retrieving slave time code and status information from the slave playback unit 20 and applying control signals to the playback unit 20. Status information such as the current operating state of the slave playback unit 20 (namely, whether the unit is in a playback mode, rewind mode, fast forward mode etc.) is processed in a conventional manner by a general control block 34 which transfers the processed information to the central computer in a format appropriate for the computer. The general control block 34 also receives general control signals received from the central computer such as stop, start, fast forward and rewind commands and applies corresponding command signals to the slave playback unit 20 by transmission along a data bus 35 and through the interface board 32. It should be noted that the interface board 32 is similar to the interface board 28, ensuring that signals transmitted between the slave playback unit 20 and the local synchronization controller 30 are transformed to a common protocol. These matters are conventional and will not be described further in order to highlight inventive aspects of the synchronization controller.

The local synchronization controller 30 includes a time code transforming block 36 which may typically be constituted by a fast-operating microprocessor. The purpose of the block 36 is to transform retrieved slave time code according to a predetermined relationship into virtual time code in real time. This relationship will usually consist of a simple multiplication or scaling of the retrieved time code (when transformed into a single number representing units of the smallest time interval used by the system, namely, a single frame or subframe duration). The scaling factor used by the time code transforming block 36 is received as a transform control signal from the central computer 14 and can be specified by the operator. The effect of such a transformation and adjustment thereof will be described more fully below.

The local synchronization controller 30 includes a time code comparator block 38 which compares two signals, namely, the time code retrieved from a master unit and the virtual slave time code generated by the time code transforming block 36 and produces a virtual offset, namely, the offset existing between the retrieved master time code and the virtual slave time code. The virtual slave time code and the virtual offset are transmitted along the data bus 25 to the central computer 14 which then controls the display of this information on the monitor 24.

In slave-type operation, the local synchronization controller 30 maintains the virtual offset at a substantially constant value. The required value can be specified by the operator at the computer keyboard 16 and is received and stored by an offset comparator block 40. The offset comparator block 40 compares the operator specified offset with the virtual offset generated by the time code comparator block 38 and produces an error signal which is applied through a gate block 42 to a speed control 44. The speed control 44 then adjusts the operating speed of the slave playback unit 20 in a conventional manner to maintain the virtual offset at the required value.

It will be apparent that in slave-type operation of the local synchronization controller 30 there is an inherent feedback arrangement in which the virtual offset is maintained constant. The effect of transforming the retrieved slave time code into a virtual time code will now be described. For purposes of explanation, it will be assumed that the virtual time code corresponds to the retrieved slave time code multiplied by a scaling factor arbitrarily designated by the constant $\beta$. Accordingly, the current retrieved portion of the slave recording has a time code of 1:08:25:10 but the current virtual time code value is 1:14:12:15 (as displayed on the monitor 24). Because the retrieved slave time code is artificially increased, the offset comparator block 40 senses that the virtual offset is increasing differentially relative to the offset reference signal specified by the system operator. Because of the feedback inherent in the system, the speed control 44 ultimately slows the operation of the slave playback unit 20 by a factor of $1/\beta$ relative to the speed at which the slave playback unit 20 would otherwise have been operated if the retrieved slave time code had not been transformed. By choosing a scaling factor less than 1, the slave playback unit 20 can be operated at a greater speed than the master playback unit 18 (effectively compressing the relevant audio recording relative to the master video recording); by choosing a scaling factor greater than 1, the slave playback unit 20 can be operated at a slower speed than the master playback unit 18 (effectively expanding or stretching the relevant audio recording relative to the master video recording). Accordingly, a novel synchronization speed control mechanism is provided in which by selecting an appropriate relationship between the virtual and retrieved slave time codes the operator can vary the speed of operation of the slave playback unit 20 relative to the master playback unit 18.

Despite inherent variable speed operation, the synchronization system permits the slave tape 12 to be advanced automatically or manually to an appropriate position whenever the master video tape 10 is advanced to a particular frame. The central computer 14 is programmed to permit the operator at the keyboard 16 to generate and transmit signals to the master playback unit 18 via the local synchronization controller 26 to cause the master playback unit 18 to be advanced and stopped at a particular frame of the master recording. (The operator would normally review the video materials on the monitor 22 until he arrives at the required frame and then stop advancing.) The central computer 14 is also programmed to permit the operator to transmit a signal to the playback unit 20 requiring the slave tape 12 to be advanced to a corresponding portion thereof. In response to the transmitted signal and to the current value of the offset error signal, the general control block 34 advances the slave tape 12 in the appropriate direction. The offset comparator block 40 continuously compares the stored operator-specified offset with the varying virtual offset generated by the offset comparator block 40 as the the slave tape 12 is advanced, producing a continuously varying offset error signal. The general control block 34 stops the advancing of the slave tape 12 when the offset error signal reaches a zero value. Alternatively, the operator may in effect manually control the advancing of the slave playback unit 20 to the corresponding portion of the slave tape 12. During such advancing, the virtual slave time code is displayed on the monitor 24, and the operator can terminate the advancing of the slave tape 12 when he notes that the required virtual offset has been restored. The exact manner in which the master tape 10 is advanced and in which the slave playback unit 20 is actuated to advance its slave tape 12 is not essential to this aspect of the invention. The key feature is the reliance on either the virtual slave time code or the stored virtual offset to locate the appropriate portion of the slave tape 12, something which has heretofore not been possible with variable speed synchronizers. The same arrangement can be followed if a multiplicity of slave tapes are to be advanced either automatically or manually together with the master tape 10.

As mentioned above, the synchronization controller 30 and the slave playback unit 20 can be operated in master mode. For purposes of speed control in master-type operation, no master time code is processed by the time code transforming block 36. The transform is set to a scaling factor of 1 and accordingly the time code transformer block simply passes the retrieved slave time code. This time code is received by a differentiator block 46 which produces data reflecting the instantaneous speed associated with retrieval of the relevant recording. A velocity comparator block 48 compares the retrieval speed with a speed reference signal specified by the operator at the keyboard 16. An error signal proportional to the difference between the two speed signals is applied by the velocity comparator block 48 to another input terminal of the gate block 42. In such operation, the gate block 42 applies the error signal to the speed control 44 to regulate the speed of operation of the playback unit 20 accordingly. The gate block 42 is itself controlled by the general control block which sets the gate block 42 to process the velocity error signal as opposed to the offset error signal depending on whether the central computer 14 has transmitted to the synchronization controller 30 a control signal requiring master type operation including speed control by the local synchronization controller.

The operation of the synchronization system will be apparent from the foregoing description of its components. The exact operation will depend largely on the editing and reviewing functions the operator wishes to implement when ultimately deciding how the master and slave tapes 10, 12 should be played back to permit appropriate combining. He might, for example, play both tapes to determine whether offset adjustment is required. He may then set an appropriate offset to synchronize the commencement of key events recorded on both the master and slave tapes 10, 12. If both events do not expire contemporaneously, and contemporaneous expiry is required, he can instruct an adjustment to the speed of the slave playback unit 20 (in reality changing the relationship between the virtual and retrieved slave time codes). To review his changes, the operator simply advances the master playback unit 18 to the required frame of the master tape 10 and the slave playback unit 20 is automatically advanced to a corresponding portion of the slave tape 12, the system relying on the stored virtual offset to locate the corresponding audio materials. Alternatively, the operator may initiate manual-type control of advancing at the keyboard 16, view the changing virtual slave code and virtual offset on the monitor 24, and stop the advancing process when the required virtual offset is restored. Similar processes would be followed when several slave tapes are to be combined with a master tape.

A very significant aspect of the system is the display of the virtual slave time code and the virtual offset rather than actual retrieved slave time code and the actual offset which will be constantly changing during variable speed operation. According to this aspect of the invention, the operator is never aware that the actual retrieved time code of the master and slave tapes 10, 12 may be changing at disparate rates and that the actual offset between the retrieved time codes is constantly increasing or decreasing. Accordingly, he can in effect operate the synchronization system as a rudimentary constant speed and constant offset system despite the fact that variable speed control is present.

Although the system has been illustrated schematically with discrete functional blocks which can be implemented as electronic hardware, it is preferred that the various functional blocks of the local synchronization controllers, such as the time code transforming block 36, code comparator block 38, offset comparator block 40, differentiator block 46, velocity comparator block 48, general control block and gate block 42, be implemented as software routines. Signals can be transferred between the computer 14 and the synchronization controllers using conventional addressing and time multiplexing arrangements or any other appropriate techniques. The software implementation of the means performing the various functions described herein will be readily apparent.

Lastly, it will be apparent that in the embodiment of the invention described herein the virtual offset is maintained constant by use of position feedback only; that is, the master time code is compared with the virtual slave time code and the speed of operation of the slave playback unit is adjusted solely in response to an offset error signal. It is within the ambit of the invention to add a measure of velocity feedback. To that end, the time code generated by the master unit may be differentiated in the master synchronization controller to produce a master velocity signal and made available to the slave synchronization controller. The differentiator block associated with the slave synchronization controller produces a slave velocity signal which can be compared with the master velocity signal to produce a velocity error signal. The gate block can be adapted to pass a weighted average of the position and velocity error signals to the speed control to refine control of the playback unit accordingly. Such velocity feedback and other forms of feedback can be added to the basic position feedback described herein with a view to maintaining the virtual offset substantially constant and should be understood as coming within the scope of the appended claims.

It will be appreciated that a particular embodiment of the invention has been described for purposes of illustrating the principles inherent in the invention and that modifications may be made therein without departing from the spirit of the invention or the scope of the appended claims. In particular, the invention should not be regarded as limited to the synchronization of video and audio recordings stored on magnetic tapes, although it is singularly advantageous for such purposes. The principles inherent in the invention would in fact lend themselves, for example, to synchronizing the retrieval of digitized recordings where portions of such digitized recordings are stored together with time code identifying sequentially spaced-apart recording portions regardless of their actual physical location. Although in the preferred embodiment virtual slave time code has been synchronized with actual retrieved time code from a master tape, it is within the ambit of the invention to synchronize virtual slave code with virtual master code. The transformation of retrieved master time code into virtual master time code would provide an alternative or additional means for controlling the relative speed of operation of master and slave tapes given the feedback arrangement inherent in the system described. All such matters are regarded as coming within the ambit of the appended claims unless otherwise specifically indicated therein.

We Claim:

1. A control system for synchronizing sequential retrieval and playback by a slave playback unit of a slave audio stored on a slave magnetic recording tape with sequential retrieval and playback by a master playback unit of a master video recording at variable relative retrieval speeds permitting one of either compression or expansion of the playback of the slave audio recording relative to the playback of the master video recording, the master playback unit generating a master time code identifying sequentially spaced-apart portions of the master recording, the slave playback unit generating a slave time code identifying sequentially spaced-apart portions of the slave recording, the control system comprising:

means permitting an operator to specify a relationship for transformation of the slave time code into a virtual slave time code in which the relationship comprises a scaling of the slave time code according to a scale factor and in which the relationship specifying means permit the operator to specify the magnitude of the scale factor:

means for transforming the slave time code into a virtual slave time code according to the specified relationship;

code comparator means for comparing the master time code with the virtual slave time code and in response generating a virtual offset representing the offset existing between the master time code and the virtual slave time code;

offset selection means for permitting an operator to select the magnitude of an offset reference to be maintained between the master time code and the virtual slave time code;

offset comparator means for comparing the virtual offset with the operator-selected offset reference and in response generating an error signal representing the difference therebetween; and, control means for receiving said error signal and in response adjusting the rate of retrieval and playback of the slave recording by the slave playback unit such that the operator selected offset reference is maintained between the master time code and the virtual slave time code, thereby synchronizing sequential retrieval and playback of the slave audio recording with the master video recording at a speed related to the speed of retrieval and playback of the master video recording by said scale factor.

2. A system as claimed in claim 1 comprising display means for displaying the master time code, the virtual slave time code, and the offset between the master time code and the virtual slave time code.

3. A system as claimed in claim 2 comprising:
means for permitting an operator to selectively advance the master playback unit to a desired portion of the master recording;
means for permitting an operator to selectively advance the slave playback unit such that, upon advancing the master playback unit to the desired portion, the operator can advance the slave tape to a corresponding portion of the slave tape for which the displayed virtual slave time code corresponds to the displayed master time code associated with the desired portion of the master recording plus the operator-selected offset reference.

4. A system as claimed in claim 1 comprising:
means for storing the value of the operator-selected offset reference;
means for permitting an operator to selectively advance the master playback unit to a desired portion of the master recording; and
automatic means responsive to the stored offset and to the virtual slave time code for advancing the slave playback unit to a portion of the slave recording for which the virtual slave time code corresponds to the master time code associated with the desired portion of the master recording plus the stored offset.

* * * * *